(12) United States Patent
Kolotilenko

(10) Patent No.: US 6,817,190 B2
(45) Date of Patent: Nov. 16, 2004

(54) BLADE COOLING IN A GAS TURBINE ENGINE

(75) Inventor: Mikhail Kolotilenko, Zaporozhe (UA)

(73) Assignee: ALM Development, Inc., Washington, DC (US)

(*) Notice: Subject to any disclaimer, the term of this patent is extended or adjusted under 35 U.S.C. 154(b) by 0 days.

(21) Appl. No.: 10/224,973

(22) Filed: Aug. 20, 2002

(65) Prior Publication Data

US 2004/0035118 A1 Feb. 26, 2004

(51) Int. Cl.⁷ ............................. F02C 7/18; F01D 5/18
(52) U.S. Cl. .................. 60/806; 415/115; 416/97 R
(58) Field of Search .................. 60/782, 806; 415/115; 416/97 R

(56) References Cited

U.S. PATENT DOCUMENTS

| | | | | |
|---|---|---|---|---|
| 2,236,426 A | * | 3/1941 | Faber ....................... | 416/90 R |
| 2,401,826 A | * | 6/1946 | Halford .................... | 416/97 R |
| 2,506,581 A | * | 5/1950 | Cowles, Jr. ............... | 415/115 |
| 2,656,147 A | * | 10/1953 | Brownhill et al. ......... | 416/97 R |
| 2,722,101 A | * | 11/1955 | Wosika ..................... | 60/726 |
| 4,791,784 A | * | 12/1988 | Minardi et al. ............ | 60/262 |
| 6,077,035 A | * | 6/2000 | Walters et al. ............ | 415/115 |
| 6,272,844 B1 | * | 8/2001 | Rakhmailov et al. ...... | 60/805 |
| 6,305,157 B1 | * | 10/2001 | Rakhmailov ............... | 60/805 |

* cited by examiner

Primary Examiner—Ted Kim
(74) Attorney, Agent, or Firm—Hughes Hubbard & Reed LLP; Ronald Abramson; Douglas D. Zhang

(57) ABSTRACT

A gas turbine engine rotor has a body and blades, which are attached to the rotor by a root portion, for receiving a hot fluid flow and a compressed fluid from a compressor. Each blade has a base portion, an external airfoil surface, a blade flow portion of the airfoil, and a passage system communicating with the compressor and with the blade flow portion to create a thermal insulating boundary between the heated fluid and the external airfoil surface. The rotor has a substantially planar platform member, extending substantially transversally to the body of the blade and having an upstream portion protruding in the direction toward the combustion zone. The platform member has at least a pair of openings on either side of the airfoil, the openings being positioned in series along the blade flow portion. One opening of the pair defines an inclined passage in the platform member, and the other opening is separated by a partition from the first opening. The airfoil surface of the blade has a guide portion, which extends beyond the platform member toward the root portion, and the platform member and the guide portion define nozzles on either side of the airfoil surface to increase velocity of the compressed fluid flow.

4 Claims, 8 Drawing Sheets

BLADE COOLING IN A GAS TURBINE ENGINE

BACKGROUND OF THE INVENTION

1. Field of the Invention

The invention relates to the field of gas turbine engines, and more specifically, to an improved turbine rotor and a gas turbine engine using compressor fluid to maintain a thermal boundary layer between turbine blades and heated fluid from the combustor.

2. Description of Related Art

A type of prior art gas turbine has a compressor, a fuel source, a source of air for combustion, a casing, and a combustor. The combustor has a combustion zone that is connected to a fuel source and a source for combustion air. It contains a cooling zone for cooling the resulting heated fluid before reaching the turbine. The combustor cooling zone is connected to the compressor. The heated fluid temperature fluctuates depending on operating conditions. In conventional gas turbine engines, these temperature fluctuations result in strong temperature-induced stresses imparted on the engine components.

In these prior art gas turbines, virtually the entire compressor fluid flow is directed to the combustor. Fluid heated in the combustor is cooled by the compressor fluid flow in the combustor cooling zone. This engine has a turbine rotor disk with blades that receive heated fluid from the combustor. The temperature of this heated fluid is quite high and, under certain conditions, the fluid can overheat the turbine rotor disk blades. To prevent such overheating, each blade has an interior channel that receives air from the compressor. As a result, part of the fluid coming from the compressor (about 3% to 5% of the total flow) is supplied to the interior channel of the blades to keep their temperature within design limits. One example of this gas turbine engine is disclosed in U.S. Pat. No. 3,826,084 to Branstrom et al.

The heated fluid also has to be cooled after fuel combustion. Normally, this is done in the combustor, to which the major part of the fluid from the compressor would be admitted.

Thus, in this type of prior art gas turbine, substantially all of the fluid coming from the compressor is supplied to the combustor cooling zone to cool the fluid before it enters the turbine. When fluid from the compressor is mixed with the heated fluid in the combustor cooling zone, about 3% to 5% of the fluid's energy is lost. Diverting about 3% of fluid from the compressor to the turbine rotor disk blades results in another 3% in losses. In addition, the combustor for this prior art gas turbine has to be made larger to accommodate the cooling zone.

It is also known to operate a gas turbine engine having a compressor for producing a compressed fluid flow, a casing, a combustion zone in the casing, a power turbine rotor disk with blades, each having an external airfoil surface with a leading surface and a trailing surface, an inlet edge positioned immediately downstream of the combustion zone, and an outlet edge positioned downstream of the inlet edge, a blade flow portion located adjacent said trailing surface of said external airfoil surface and between said inlet edge and the outlet edge, wherein the compressed fluid is supplied from the compressor to the blade flow portion, fuel and air for combustion are supplied to the combustion zone to prepare a heated fluid, and the heated fluid from the combustion is supplied directly to the blade flow portion (e.g., U.S. Pat. No. 6,305,157 to Rakhmailov). In this method, compressed fluid flow from the compressor supplied to the blade flow portion amounts to between 55% and 85% of the total fluid flow from the compressor. The fluid from the compressor forms a protective layer on the blade flow portion of the blades, preventing the hot fluid from the combustion zone from coming into direct contact with the blade material. Since the fluid from the compressor that was being fed to the combustor dilution zone for cooling down the hot fluid before supplying it to the turbine blade is now used for blade protection, losses in the combustor dilution zone are eliminated, and the fluid directed from the compressor to the blades performs work of expansion by adding to the energy.

A gas turbine engine for carrying out this method has a power turbine rotor disk with blades, each having an internal passage for receiving the compressed fluid from the compressor and passing the compressed fluid through at least one opening to the blade flow portion. The compressed fluid flow moves along the blade flow portion to create a thermal insulating boundary between the heated fluid and the trailing surface of the external airfoil surface.

This type of gas turbine engine has an internal passage in the blade, which make it harder to manufacture the blades. It is known that providing cooling passages in conventional gas turbine blades has always been a problem, making the manufacture of the blades more difficult. Moreover, the presence of internal passages and openings in the blades compromise their strength and durability and requires additional measures to be taken to assure reliability of blades in operation. All this makes this type of gas turbine blade more expensive and labor intensive to manufacture, and reduces the service life of the blades. In addition, the flow of the fluid from the compressor to the blade flow portion in using the above-described method of providing an insulating layer over the blade surface is restricted because the flow has to pass through slits in the blade body, which causes losses. Further, these slits in the blade body cannot be positioned in certain areas of the blade, making it difficult to assure uniform distribution of the fluid flow over the blade surface.

SUMMARY OF THE INVENTION

It is an object of the invention to provide a turbine rotor for a gas turbine engine that is easier to manufacture.

It is another object of the invention to assure better distribution of the compressed fluid flow over the blade surface with lower drag losses.

Another object of the invention is to provide a gas turbine rotor having blades that do not have internal passages.

A further object of the invention is to prolong the life of the gas turbine engine.

The foregoing and other objects are accomplished through the design of a gas turbine engine rotor having a body and blades, which are attached to the rotor by a root portion, for receiving a hot fluid flow and a compressed fluid from a compressor. Each blade has a base portion, an external airfoil surface defined by a blade body with an inlet edge positioned downstream of the combustion zone, an outlet edge positioned downstream of the inlet edge, a blade flow portion of the airfoil located between the inlet edge and said outlet edge on either side of the blade, and a passage system communicating with the compressor and with the blade flow portion to create a thermal insulating boundary between the heated fluid and the external airfoil surface. The rotor has a substantially planar platform member, extending substantially transversally to the body of the blade and having an upstream portion protruding beyond the inlet edge in the direction toward the combustion zone. The platform member has at least a pair of through openings on either side of the airfoil, said openings being positioned in series along said blade flow portion. One opening of the pair that is remote from the inlet edge defines an inclined passage in the platform member, and the other opening is separated by a partition from the first opening and has an opposite wall extending in a spaced relation to the inlet edge.

With this construction, the body of the blade does not have any internal passages or slits, and all flows, including the compressed fluid flow coming from the compressor for cooling the blade by insulating it from the hot fluid flow, occur outside the blade body. This facilitates manufacture of the blade and also improves strength and durability of the blade, prolonging the blade life and enhancing its reliability.

The airfoil surface of the blade has a guide portion, which extends beyond the platform member toward the root portion, and the platform member and the guide portion define nozzles on either side of the airfoil surface to increase velocity of the compressed fluid flow.

Other objects and advantages of the invention will become apparent from the following detailed description of preferred embodiments and accompanying drawings.

DETAILED DESCRIPTION OF THE DRAWINGS

Figure 1:
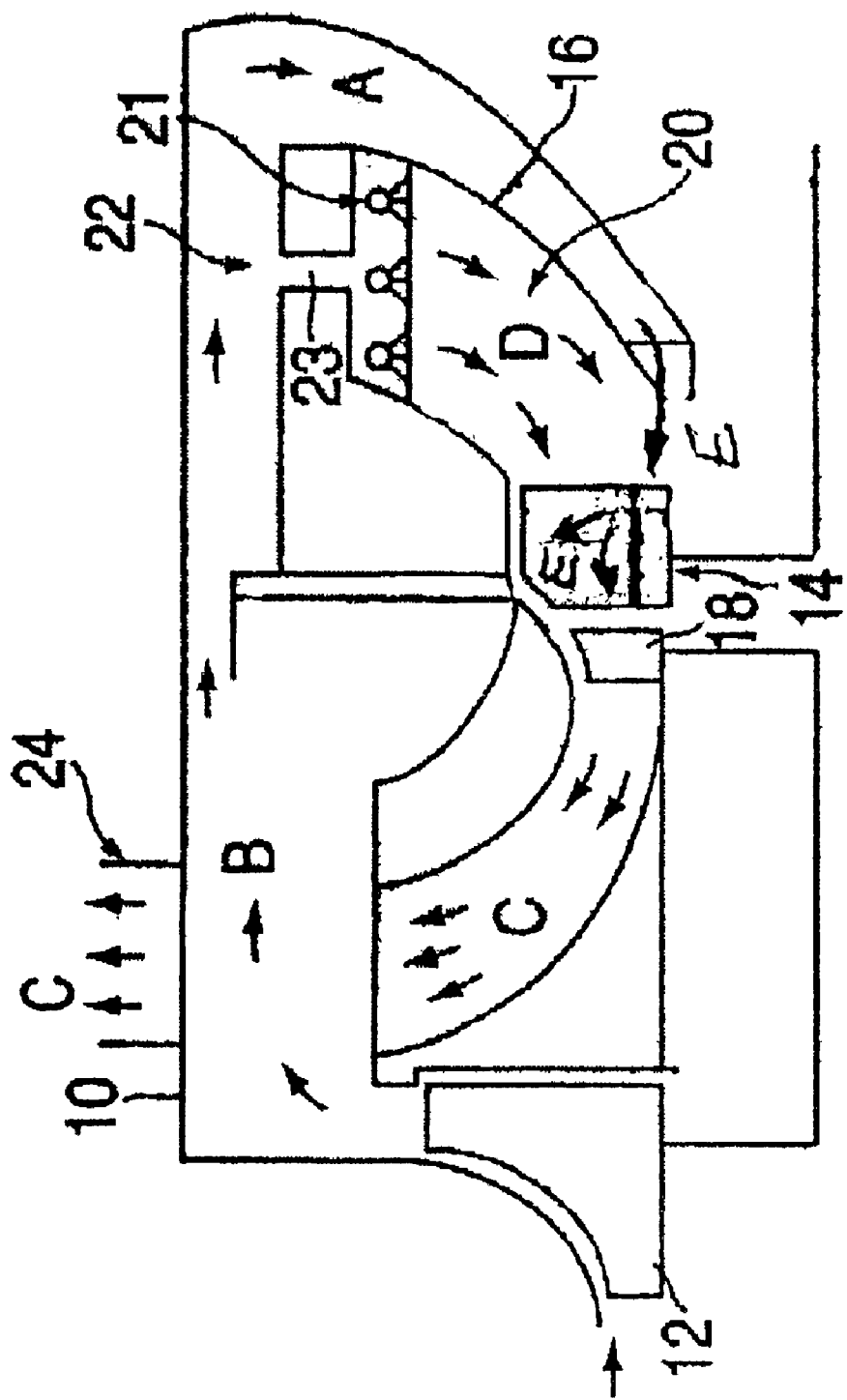
FIG. 1 shows a diagram of a gas turbine engine according to the invention.

In FIG. 1, a gas turbine engine has a casing 10, a compressor 12 for supplying a compressed fluid, a turbine rotor 14 mounted downstream of compressor 12, a combustor 16 to prepare heated fluid for the turbine, and a compressor turbine rotor 18 for driving compressor 12. In the embodiment shown, turbine rotor disk 14 is located immediately downstream of combustor 16. Turbine rotor disk 14 rotates in a direction opposite to that of compressor rotor disk 18. Fluid flows from turbine rotor disk 14 directly to compressor turbine rotor disk 18. Combustor 16 communicates with a fuel source (not shown). Combustor 16 defines a combustion zone 20 that occupies substantially the entire interior space of the combustor 16. Combustion air is supplied in the direction shown schematically by arrow A to the inlet part of the combustor 16 where nozzles 21 are located. Passage 23 schematically shows a supply of air for combustion.

Most of the fluid from compressor 12 is supplied to turbine rotor disk 14, bypassing combustor 16, as shown by arrows B, through duct 22 in casing 10. In a preferred embodiment, the range of fluid flowing directly to the turbine is between approximately 55% and 85% of the total fluid flow. This fluid flow is admitted to turbine rotor disk 14, envelops the turbine blades and goes to compressor turbine rotor disk 18 to drive compressor 12. Exhaust gases from compressor turbine rotor disk 18 are removed through an exhaust manifold 24 in the direction shown by arrows C.

Only that part of the total fluid that is used for fuel atomizing (about 25% of the entire quantity of the fluid from the compressor) is supplied to combustor 16 through nozzles 21. Combustor 16 does not have a cooling zone. Fluid goes uncooled from combustor 16 to turbine rotor 14 in the direction shown schematically by arrows D. The fluid from compressor 12 moves as shown by arrows E both to cool the heated fluid that leaves combustor 16 and to protect the blades of turbine rotor disk 14 against damage. The manner in which it is done will be described below.

Figure 2:
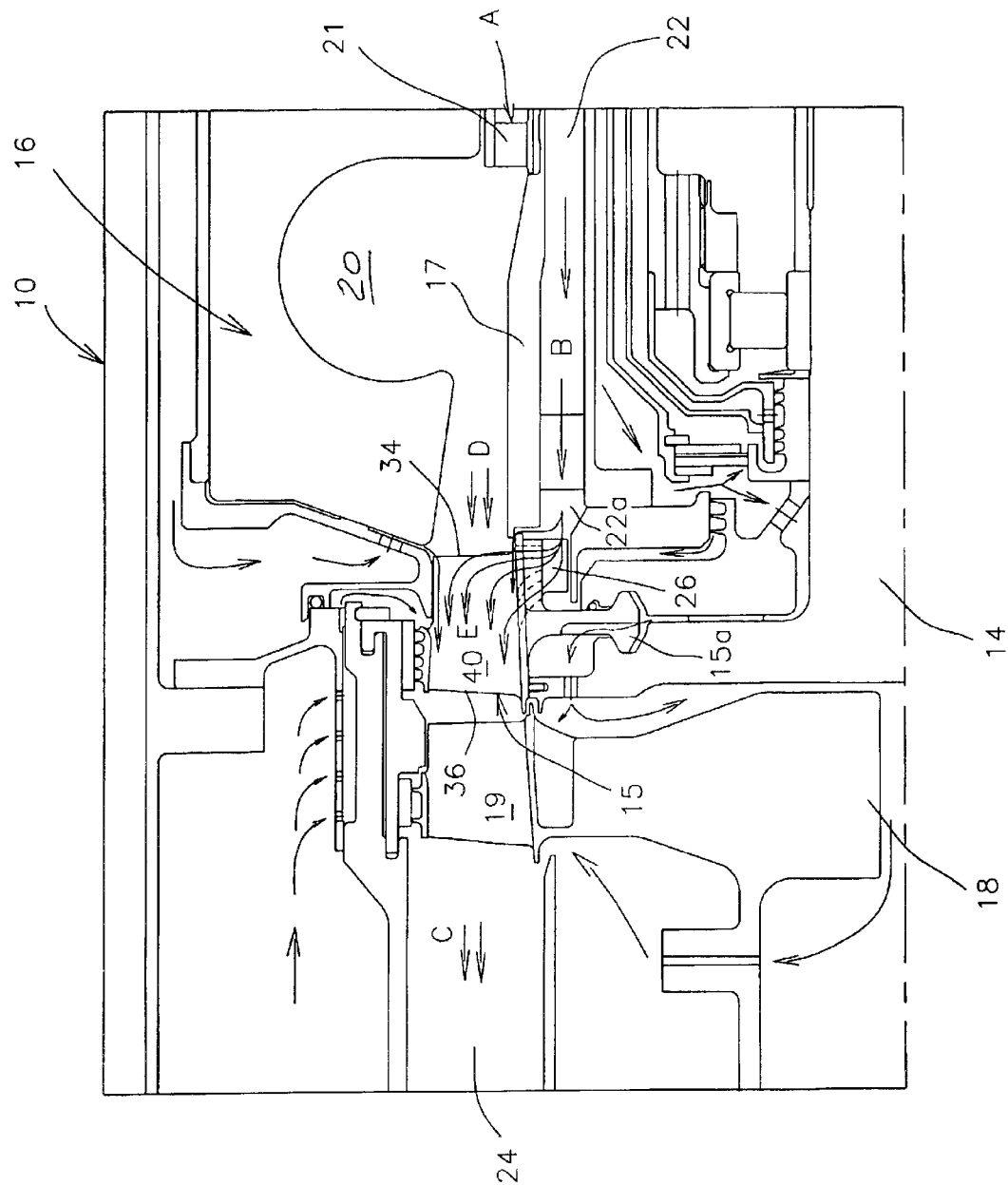
FIG. 2 shows a side elevation sectional view of a gas turbine engine according to the invention (the compressor is not shown).

As shown in FIG. 2, turbine rotor disk 14 has blades 15 mounted by means of a root portion 15a in the rotor disk and is located immediately downstream of combustor 16 to receive the heated fluid formed in combustion zone 20 as shown by arrows D. As air and fuel are supplied through a set of nozzles 21, a spin about the longitudinal axis of the gas turbine engine is imparted to the flow of heated fluid. This helps make the flow of the heated fluid compatible with the rotation of turbine rotor disk 14.

A compressor turbine rotor disk 18 is mounted downstream of turbine rotor disk 14 and has blades 19. Duct 22 connects the space between turbine rotor disk 14 and a compressor (not shown) in a zone 22a, which is defined by an inner annular wall 17 of combustor 16. The fluid from compressor 12 moving in a direction along arrow B is admitted to the turbine rotor blades 15.

Figure 3:
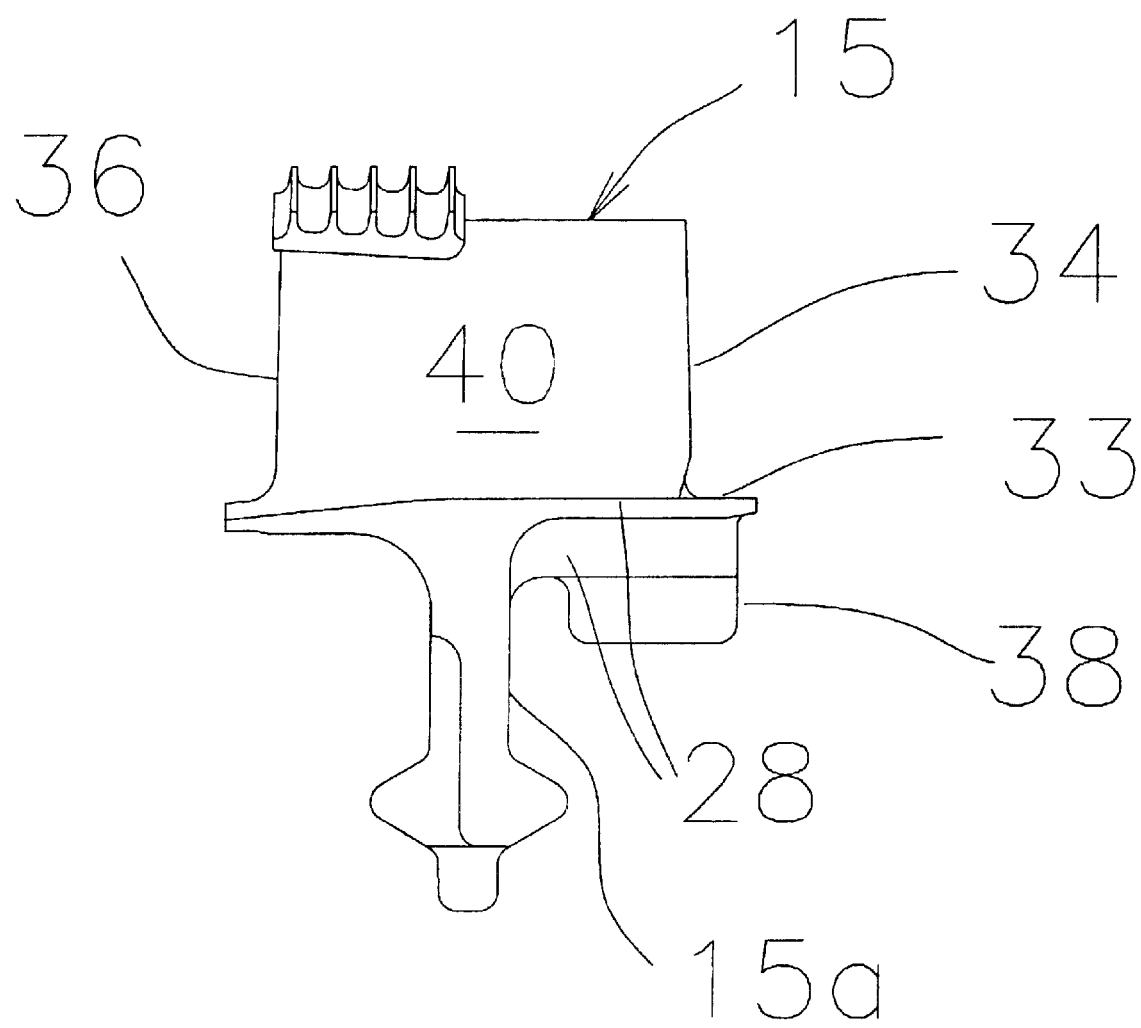
FIG. 3 shows a general view of a turbine blade according to the invention for the gas turbine engine shown in FIG. 2.

As shown in FIG. 3, portion 40 between inlet edge 34 and outlet edge 36 of blade 15 defines a blade flow portion along which the fluid from the compressor moves after leaving a system of passages that will be described below. This fluid envelops blade flow portion 40 of blade 15, thus forming a layer of fluid over the blade surface and providing a thermal insulating layer against the heated fluid coming from combustor 16. As shown in FIG. 2, the heated fluid is formed in combustion zone 20 using combustion air and fuel fed from a fuel source (as shown by arrow A), and moves to blade 15 without being preliminarily cooled. When this heated fluid reaches blade 15, it will move along blade flow portion 40 over the layer of the relatively cool fluid (shown by arrows E) that is supplied from compressor 12 through duct 22, and only partly mixes with it. This layer separation of hot and cool fluid protects the blade against overheating.

As shown in FIGS. 3 through 6, a system of passages 26 is made in platform member 28. Platform member 28 is a planar member extending transversally to the plane of blade 15 (substantially perpendicular in this embodiment to the plane of blade 15). The system of passages 26 is made as at least a pair of openings 30, 30a and 31, 31a (FIGS. 5 and 6) in platform member 28 on either side of inlet edge 34 of blade 15. As mentioned above, only about 25% of the compressor fluid (air) goes for combustion in a preferred embodiment. It will be understood that the rest of the compressor fluid is used for cooling the blades (less a certain small quantity that is used for cooling other heated parts in the turbine duct as explained below). The openings 30, 30a and 31, 31a, respectively, on either side of the airfoil are arranged in series along blade flow portion 40. One opening 30, 31 of each pair of openings that is remote from inlet edge 34 defines an inclined passage 30' in platform member 28 (FIG. 4), having an inclined partition 32. The inclination of partition 32 is chosen in such a manner as to direct the fluid coming from compressor 12 (as shown by arrows B) to blade flow portion 40 of blade 15. The thickness of partition 32 should be as small as possible in order not obstruct the flow cross-section and to minimize pressure losses. The other opening 30a, 31a of each pair of openings has one wall 31' that is formed by the same partition 32, and another wall 33 extending in a spaced relation to inlet edge 34 of blade 15. It will be understood that wall 33 is located upstream of inlet edge 34. It will be apparent that with this arrangement, the flow of fluid from compressor 12 is divided into two flows on either side of inlet edge 34 (as shown by arrows E). One flow emerging from the passage 30 (31) is directed as shown by arrow $E_1$ to the lower part of the airfoil adjacent to root portion 15a of blade 15. The other flow goes to the middle and upper parts of blade flow portion 40 of blade 15 (arrows $E_2$–$E_3$) and along inlet edge 34 (arrow $E_4$). It can be seen that this arrangement of the passages 30, 31, 30a, and 31a maximizes coverage of the major part of the airfoil of blade 15 to provide a layer of colder fluid between the blade material and the hot fluid coming from combustion zone 20.

Figure 4:
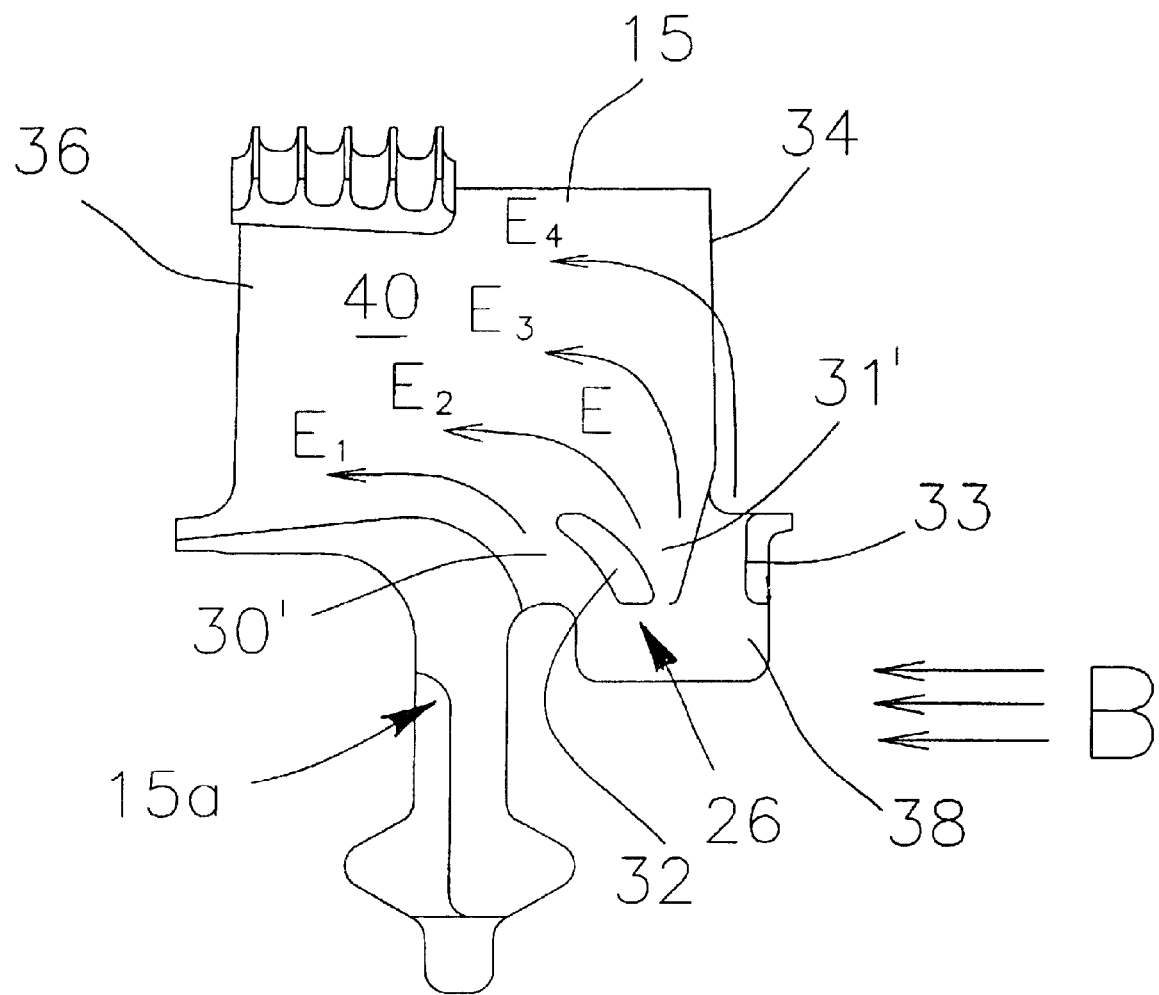
FIG. 4 shows the turbine blade of FIG. 3, partially in section.
Figure 5:
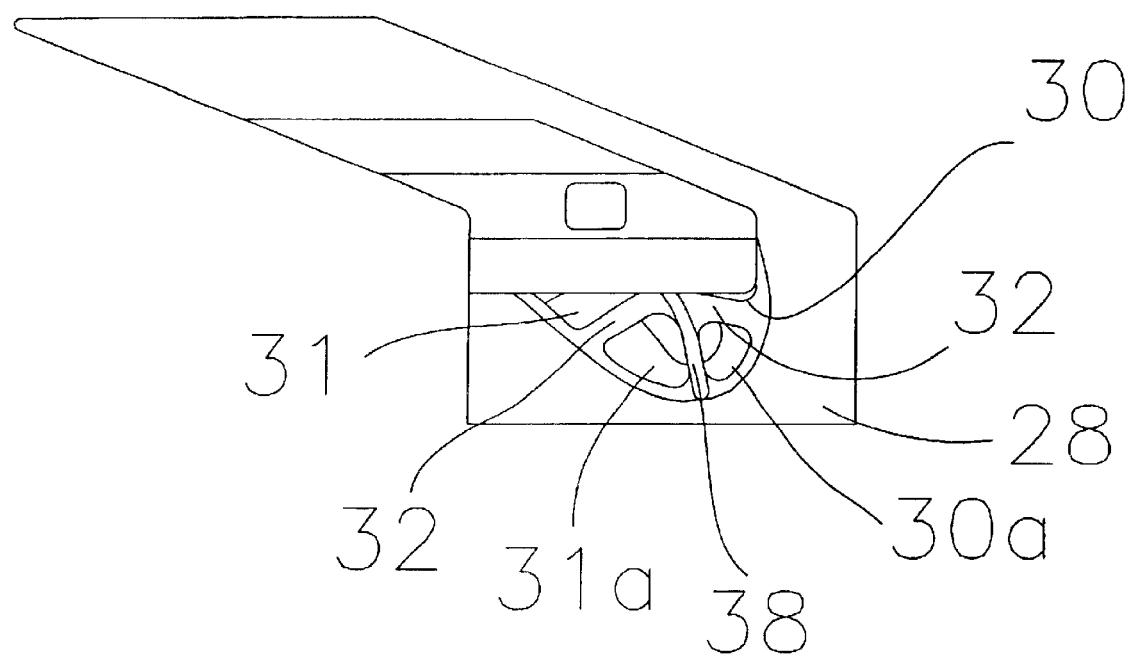
FIG. 5 is a bottom view of the turbine blade of FIG. 3.
Figure 6:
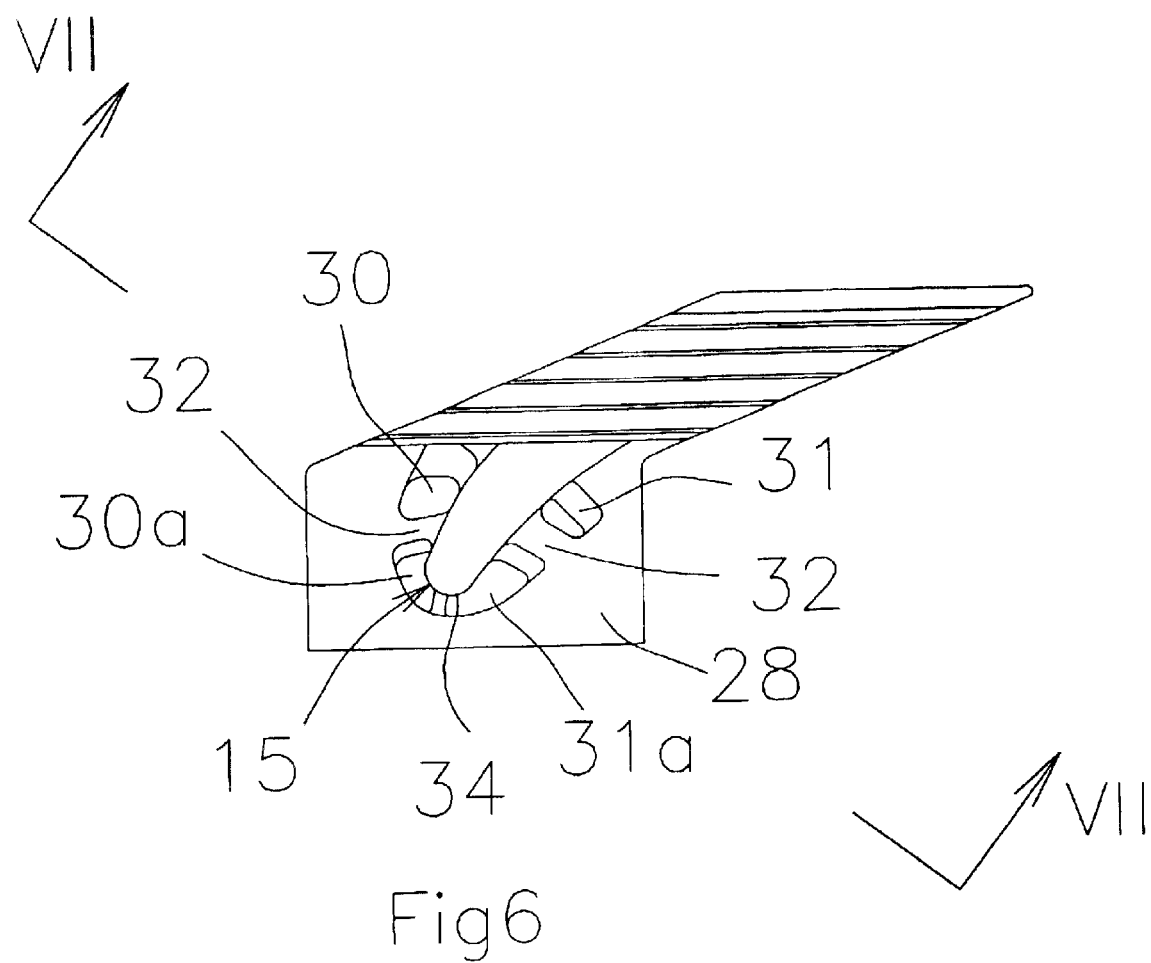
FIG. 6 is a top view of the turbine blade of FIG. 3.
Figure 7:
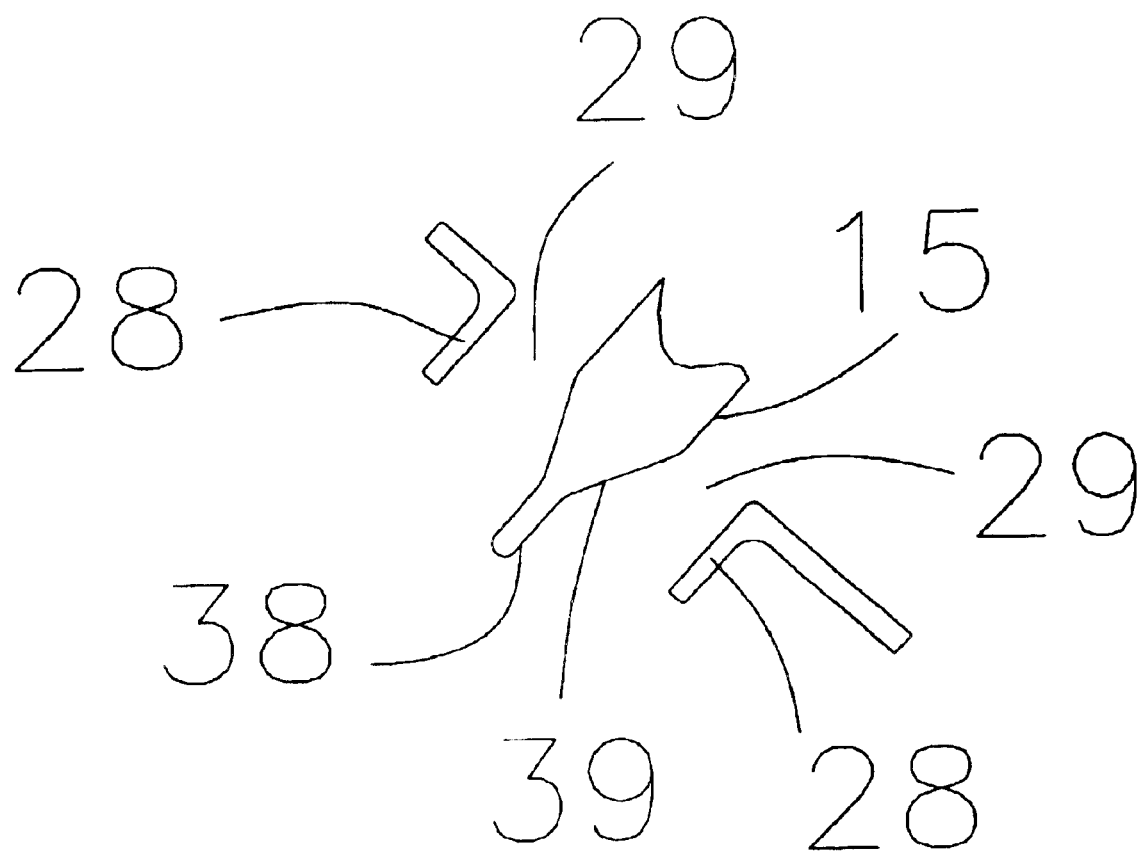
FIG. 7 is a cross-sectional view taken along line VII—VII in FIG. 6.

As shown in FIGS. 3 through 5, blade 15 has a guide portion 38 that extends beyond platform member 28 in the direction toward root portion 1 Sa. This guide portion, which is made as thin as possible in order to reduce the resistance to the flow, defines with platform member 28 nozzles 29 as can be seen in FIG. 7. Nozzles 29 are defined by providing divergent portion 39 between the guide portion 38 and the main body of blade 15. Nozzles 29 increase the velocity of flow that goes to the blade flow portion 40 to compensate for forces by the hot fluid flow and to assure that the flow of cooler fluid form the compressor does not separate from blade flow portion 40.

When the heated fluid leaves blades 15 of turbine rotor disk 14, it moves to blades 19 of compressor turbine rotor disk 18. It should be noted that the fluid from compressor 12 that envelops turbine blade 15 also moves to compression turbine blade 19. When the heated fluid and the fluid from compressor 12 reach compressor turbine rotor disk 18, they both will have about the same temperature.

The description of this embodiment shows that there is no cooling zone in combustor 16. The absence of a cooling zone in combustor 16 means a smaller combustor size and elimination of cooling zone losses that occur in mixing the heated fluid with a cooler fluid. When the heated fluid moves along blade flow portions 40 of blades 15 over the fluid layer from the compressor, there is only incomplete mixing of the two fluids, so the losses in this zone are minimized. Because the compressor fluid is cooler, it has lower viscosity. This lower viscosity fluid moves along the blade surface and determines the boundary losses. According to principles of fluid mechanics, because the heated fluid, which is at a temperature of about 2,000K, has a higher viscosity, it is prevented from moving over the blade surface by the lower viscosity (cooler) fluid. Thus, there is no direct contact between the heated fluid and the surface of the engine components, so these components do not experience thermally-induced stress to the same degree as prior art gas turbines. Moreover, the temperature of the cooler fluid fed from the compressor—which does contact the blade material— reduces that fluid's corrosiveness to the blade material relative to the corrosiveness of heated fluid coming directly from the combustor. This prolongs blade life.

In addition to undergoing incomplete mixing, the heated fluid and the fluid from the compressor expand when they meet, decreasing the temperature of the heated fluid. Consequently, the oxidation reactions downstream of the combustor will not be as intensive as in the prior art gas turbine engines. This means that less $NO_x$ will be formed, and the engine according to the invention consequently will be less harmful to the environment.

When fluid is fed from the compressor to the turbine blades, it carries a large amount of energy. In the embodiment shown, the quantity of compressed fluid from the compressor is greater than the quantity of heated fluid coming from the combustor. Although it is cooler than the heated combustor fluid, the fluid from the compressor expands in the area between the inlet and outlet edges of the blades, performing work (in addition to the work performed by the expansion of the heated fluid from the combustor). In conventional gas turbine engines, the fluid from the compressor is introduced into the combustor cooling zone, resulting in cooling losses. These cooling losses are avoided in the present invention, and instead, expansion of the fluid from the compressor, which is not passing through a dilution zone of the combustor as is the case in conventional gas turbine engine with ensuing pressure losses, can contribute significantly to the output of the turbine.

It can also be seen from the above description that no cooling passages or other cavities for the purposes of cooling are made in the airfoil or in the blade. The entire cooling system for the blade is provided in platform member 28, which is outside the blade and which is open on both sides. This greatly simplifies the manufacturing process because both surfaces of platform member 28 are accessible during manufacture, and the blade is not weakened by passages and cavities that are normally provided for blade cooling. The blade can be made thinner, and its strength, reliability, and durability are not compromised because of the presence of passages and cavities for cooling.

Figure 8:
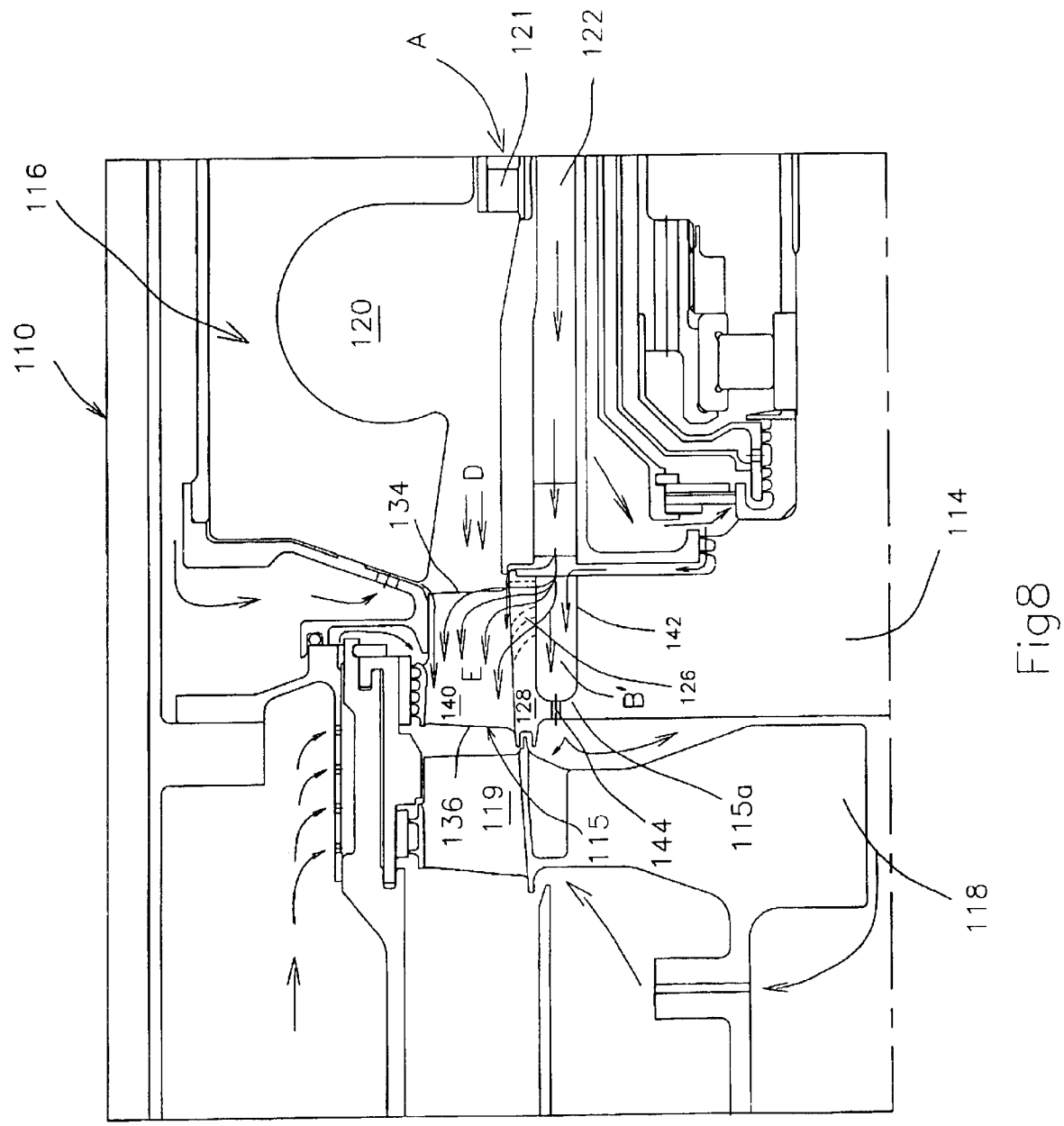
FIG. 8 shows another embodiment of the gas turbine engine according to the invention.

In another embodiment of a gas turbine engine shown in FIG. 8, where similar parts are shown at the same reference numerals as in FIG. 2 with the addition of 100, the only difference is that the gas turbine engine has a blisk (rotor disk made integral with the turbine blades). Blades 115 are made in such a manner that their base portions 115a are integral with rotor disk 114. Blisk is normally used for a second stage turbine, but it is not known to use a blisk in a first stage turbine with a combustor without a dilution zone especially if the blisk is made of conventional gas turbine materials (metal alloys), rather than from ceramics.

Blade 115 and its system of passages 126 are designed and function along the same lines as described with reference to FIGS. 2 through 7 above. Base portion 115a of blade 115 and the adjacent area of rotor disk 114 are cooled by providing a recess 142 in the end face of rotor disk 114 on the side of combustor 116 (i.e., opposite to duct 122). Recess 142 at each blade 115 may be in the form of a circular bore or an elongated hole in the cross-section of the recess by a plane drawn in parallel with the end face of rotor disk 114 (or perpendicularly to the centerline of rotor disk 114). Recess 142 has a discharge port 144 for establishing a flow of compressor fluid coming from the compressor (not shown) though duct 122 as shown by arrows B'. This flow leaves recess 142 through discharge port 144 into the gas turbine flow duct downstream turbine rotor disk 114. It will be apparent that the ratio of the cross-section areas of recess 142 and discharge port 144 is chosen in such a manner as to assure the flow of the cooling fluid through recess 142 that is sufficient to cool the base portion 115a of blade 115 and the adjacent areas of rotor disk 114. It will be understood that a plurality of recesses 142 and discharge ports 144 may be provided for each blade 115 (e.g., a single recess and a plurality of the discharge ports, a plurality of recesses, each having a discharge port, or a plurality of discharge ports).

For the rest, the embodiment of the gas turbine engine shown in FIG. 8 functions similarly to the embodiment described in FIG. 2. The advantages of the embodiment shown in FIG. 8 are the same as those described with reference to FIG. 2, plus the known advantages of the blisk.

It will be understood that the cooling of all other portions of blades 15 (115) and rotor disk 14 (114) is assured in a known per se manner as shown by unreferenced flow arrows in FIGS. 2 and 8, respectively.

Preferred embodiments of the invention have been described above. It is, however, understood that various modifications and changes to the embodiments presented herein are possible without going beyond the spirit and scope of the invention defined in the attached claims.

I claim:

1. In a gas turbine engine having a compressor, a combustor for producing hot fluid flow, a power turbine having a rotor disk positioned immediately downstream of the combustor, the rotor disk having a plurality of blades for receiving the hot fluid flow, each said blade comprising:
    a root portion;
    an airfoil having two sides along which the hot fluid flows, an inlet edge positioned downstream of the combustor, an outlet edge positioned downstream of said inlet edge, a blade flow portion located between said inlet edge and said outlet edge on each of said sides of said airfoil; and
    a platform member extending transversally with respect to said airfoil and having an upstream portion protruding with respect to said inlet edge in the direction toward the combustor, said platform member further having at least a pair of openings on each of said sides of said airfoil, and arranged in series along said blade flow portion for directing fluid from the compressor to flow along said blade flow portion to create a thermal insulating boundary between the hot fluid and said sides of said airfoil, one of said openings of each of said pair of openings that is remote from said inlet edge defining an inclined passage in said platform member, the other opening of each of said pair of openings being separated by a partition from said one opening of each of said pair of openings and having an opposite wall extending in a spaced relation to said inlet edge.

2. A blade as claimed in claim 1, wherein said airfoil has a guide portion that extends beyond said platform member in the direction toward said root portion, said platform member and said guide portion defining a nozzle on each of said sides of said airfoil.

3. In a gas turbine engine having a compressor, a combustor for producing hot fluid flow, a power turbine having a rotor disk positioned immediately downstream of the combustor, the rotor disk having blades for receiving the hot fluid flow, each said blade comprising:
    a base portion being integral with the rotor disk and having at least one recess on a first surface facing the combustor, and at least one discharge port that communicates with said recess and terminates at a second surface positioned downstream of said first surface;
    an airfoil having two sides along with which the hot fluid flows, an inlet edge positioned downstream of the combustor, an outlet edge positioned downstream of said inlet edge, a blade flow portion located between said inlet edge and said outlet edge on either side of said airfoil: and
    a platform member extending transversally with respect to said airfoil and having an upstream portion protruding with respect to said inlet edge in the direction toward the combustor, said platform member further having at least a pair of openings on either side of said airfoil, and arranged in series along said blade flow portion for directing fluid from the compressor to flow along said blade flow portion to create a thermal insulating boundary between the hot fluid and either side of said airfoil, one of said opening of each of said pair of openings that is remote from said inlet edge defining an inclined passage in said platform member, the other opening of each of said pair of openings being separated by a partition from said one opening of each of said pair of though openings and having an opposite wall extending in a spaced relation to said inlet edge.

4. A blade as claimed in claim 3, wherein said airfoil has a guide portion that extends beyond said platform member in the direction toward said base portion, said platform member and said guide portion defining a nozzle on either side of said airfoil.

* * * * *